United States Patent

Kobayashi et al.

[15] 3,665,916
[45] May 30, 1972

[54] CATHETER TYPE SEMICONDUCTOR RADIATION DETECTOR

[72] Inventors: Tetsuji Kobayashi; Tetsuo Sasaki, both of Yokohama-shi; Seiichi Takayanagi, Tokyo; Toru Sugita, Yokohama-shi, all of Japan

[73] Assignee: Tokyo Shibaura Electric Co., Ltd., Kawasaki-shi, Japan

[22] Filed: Aug. 28, 1969

[21] Appl. No.: 853,638

[30] Foreign Application Priority Data

| Aug. 31, 1968 | Japan | 43/75513 |
| Sept. 30, 1968 | Japan | 43/84156 |
| Oct. 25, 1968 | Japan | 43/92569 |

[52] U.S. Cl. ........................128/2 R, 250/83.3 R, 250/106 R
[51] Int. Cl. .....................................................A61b 10/00
[58] Field of Search..................128/2, 1.1, 1.2, 418, 215, 128/2 R; 250/83.3 R, 106 R

[56] References Cited

UNITED STATES PATENTS

| 3,057,356 | 10/1962 | Greatbatch | 128/419 P UX |
| 3,120,227 | 2/1964 | Hunter, Jr. et al. | 128/2.06 |
| 3,216,424 | 11/1965 | Chardack | 128/418 |
| 3,253,595 | 5/1966 | Murphy, Jr. et al. | 128/418 X |
| 3,308,819 | 3/1967 | Arp | 128/215 |
| 3,416,534 | 12/1968 | Quinn | 128/418 |
| 3,508,545 | 4/1970 | Reif et al. | 128/215 |

FOREIGN PATENTS OR APPLICATIONS

| 327,906 | 2/1958 | Switzerland | 128/2 |
| 233,160 | 3/1970 | U.S.S.R. | 128/2 |

OTHER PUBLICATIONS

NASA Tech. Brief No. 66- 10252, June, 1966, appearing in Med. & Bio. Engineering, September 1965, Vol. 5 No. 5

*Primary Examiner*—Richard A. Gaudet
*Assistant Examiner*—Kyle L. Howell
*Attorney*—Flynn & Frishauf

[57] ABSTRACT

A catheter type semiconductor radiation detector comprising a semiconductor element introduced into a living body for detecting radiation prevailing therein wherein there is provided a movable retractable needle for fixing the detecting element at a prescribed position in the living body.

7 Claims, 13 Drawing Figures

CATHETER TYPE SEMICONDUCTOR RADIATION DETECTOR

BACKGROUND OF THE INVENTION

The present invention relates to a catheter type semiconductor radiation detector allowing a semiconductor detecting element to be fixed at a desired position in the tissue of a living body.

To determine the condition of a malignant tumor, for example, cancer, there has heretofore been practiced a process of introducing a certain kind of radioisotope (hereinafter referred to as "RI") into a living body, and then introducing a catheter type semiconductor radiation detector by utilizing the fact that the RI has a nature of selectively gathering in such affected part of the living body, comparing the amounts of RI concentrated at the tumorous and normal parts to find the benignancy or malignancy of the tumor examined.

However, if an attempt is made to introduce the detecting element of the aforesaid semiconductor detector into continuously moving parts such as the gullet, stomach, womb or intestines for their examination, the detector itself will be shifted from the desired part of the affected tissue in a relatively short time. Where the tumor 1 assumes a protruding shape as illustrated in FIG. 1A, it is particularly difficult to keep the detector 2 at a desired position. Even if there occurs a tumor 1 at a concave part as shown in FIG. 1B, the detector 2 will vary its position during a long time of application due to the peristaltic motion of the tissue. Since, however, accurate examination requires a detector to be set at a fixed position for scores of minutes, the prior art detecting device has presented extreme inconvenience.

SUMMARY OF THE INVENTION

It is accordingly the object of the present invention to provide a catheter type semiconductor radiation detector capable of fixing a detecting element at a desired position in the tissue of a living body. In accordance with the present invention, a semiconductor radiation detector comprises a semiconductor detecting element to be introduced into the living body for detecting radiation prevailing therein, a flexible coaxial line for impressing an operating voltage on the detecting element and transmitting therefrom detected signals to the outside of the living body, and a fixing needle for being pricked into a desired position in the tissue of said body, thereby fixing the semiconductor radiation detector there.

DETAILED DESCRIPTION OF THE INVENTION

Figure 1A:
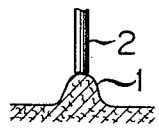
FIGS. 1A and 1B indicate the relative position of a detecting element with respect to a tumorous part.
Figure 1B:
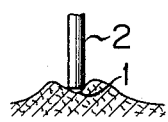
Figure 2:
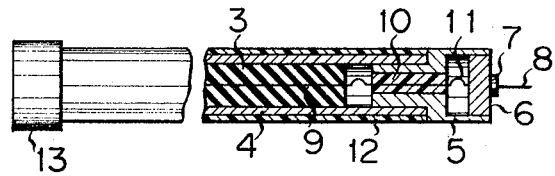
FIG. 2 is a fractional sectional view of an embodiment of the present invention.

There will now be described an embodiment of the present invention by reference to the appended drawings. Referring to FIG. 2, the external conductor 4 of a flexible coaxial line 3 extends outward at one end. To said outward extending portion is connected a hollow cylindrical metal holder 5. To the interior of an opening formed on the opposite side of the holder 5 to the external conductor 4 is bonded a semiconductor radiation detecting element 6 consisting of, for example, a silicon PN junction element or PIN junction element. To the central part of the detecting plane of the detecting element 6 is bonded a pedestal 7 using an adhesive agent commercially known as Araldite (registered trademark). On the pedestal 7 is set up a fixing needle 8, which is made of a material nontoxic to and insoluble in a living body, for example, stainless steel. The external conductor 4 of the flexible coaxial line 3 is connected through the holder 5 to one of the poles of the detecting element 6. The central conductor 9 of said coaxial line 3 is connected to the other pole of the detecting element 6 through a lead line 11 passing through the synthetic resin 10 packed in the interior of the hollow holder 5. The coaxial line 3 is coated on the outside with a waterproof polyethylene tape 12. Outside of the living body at the opposite end of the coaxial line 3 to the detecting element 6 is disposed an instrument 13 which comprises a power source for supplying said detecting element 6 with an operating voltage and a counter for counting signals issued by said detecting element 6.

Figure 3:
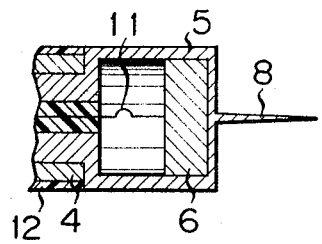
FIG. 3 is a fractional enlarged view of a modification of the embodiment of FIG. 2.
Figure 4:
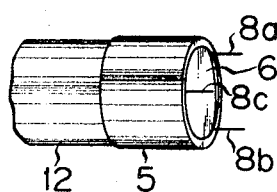
FIG. 4 is a fractional enlarged view of another modification of the embodiment of FIG. 2.

The detector 2 of the aforementioned arrangement is introduced, for example, into the stomach using the coaxial line as a guide, and the fixing needle 8 is pricked into a presumed tumorous part to fix the detecting element 6 there. In this case, there is generally used an optical fiber jointly with the detector 2. The discovery of the tumorous part is carried out through said optical fiber. FIG. 3 presents an embodiment wherein the holder 5 cores the detecting element 6 up to its detecting plane and part of said holder 5 extends outward pointedly so as integrally to form a fixing needle 8. This prevents the needle 8 from being broken while it is used in the living body. Or as shown in FIG. 4, there may be bonded a plurality of fixing needles 8a, 8b and 8c to the holder 5 surrounding the detecting element 6. It will be apparent that in this case that said fixing needles 8 may be formed integrally with the holder 5. The number of fixing needles 8 may be chosen as desired.

Figure 5:
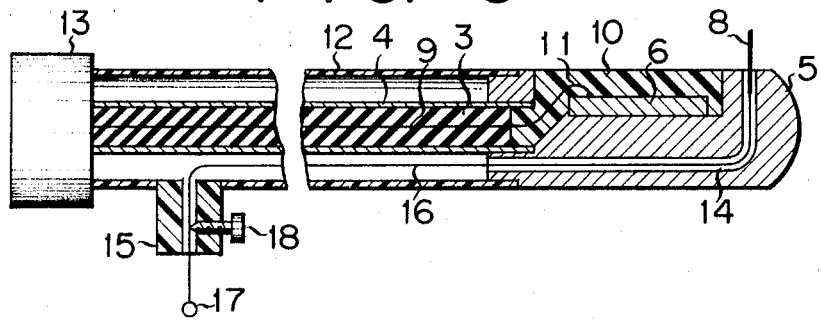
FIG. 5 is a sectional view of another embodiment of the invention.

FIG. 5 shows another embodiment of the present invention. The same parts of FIG. 5 as those of FIG. 2 are denoted by the same numerals and description thereof is omitted. According to the embodiment of FIG. 5, the detecting element 6 is bonded by synthetic resin 10 to the longitudinal side of the detector, or the upper part of the holder 5. Further, there is perforated a through hole 14 starting, as shown, with that side of the holder 5 on which there is disposed the detecting element 6. The through hole 14 is bent at some point along its length to run through a passage defined between the external conductor 4 and the waterproof polyethylene tape 12 and connected to a hollow member 15 positioned near the instrument 13. The fixing needle 8 is connected to one end of a flexible filament 16 which is movable through said through hole 14 of the aforesaid passage. Said flexible filament 16 is connected through the hollow member 15 to an operating terminal member 17 disposed outside of the living body. There is also provided a screw 18 to fix the flexible filament 16.

The embodiment of FIG. 5 is operated in the following manner. First the screw 18 is loosened so as to adjust by the operating terminal member 17 the position of the fixing needle 8 by the medium of the movable filament 16 in a manner to allow the whole of said needle 8 to be initially held in the through hole 14. Then the screw 18 is tightened, and with the fixing needle 8 still received in the through hole 14, the detector 2 is introduced into the tissue of the living body. When the tumorous part is exactly located where it is desired to fix the determining element 6, the screw 18 is loosened and the operating terminal member 17 is urged by hand or other suitable means to allow the fixing needle to be taken out of the through hole 14 and pricked into the tumorous part. When examination is brought to an end, all that is required is to reverse the operation so as to draw the fixing needle out of the tumorous part. This embodiment prevents the fixing needle from being unnecessarily projected during the operation of introducing the detector into the living body or removing it therefrom, thus saving the tissue thereof from being injured.

Figure 6:
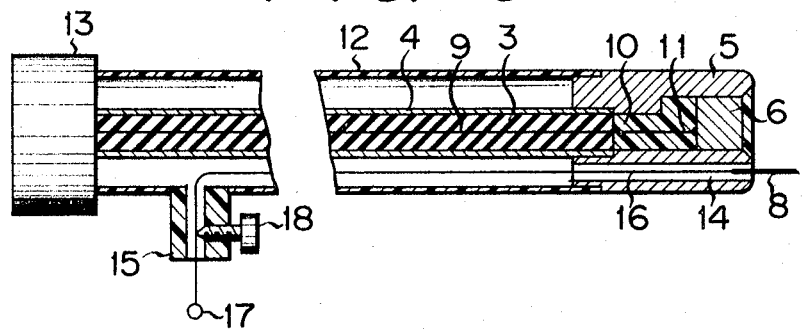
FIG. 6 is a sectional view of a modification of the embodiment of FIG. 5.

FIG. 6 is a modification of the embodiment of FIG. 5. Namely, where the detecting element 6 is positioned at the longitudinal end of the detector. The fixing needle 8 is preferably transferred similarly toward said end.

Figure 7A:
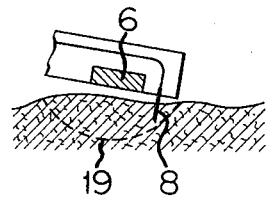
FIGS. 7A and 7B show the manner in which the embodiments of FIGS. 5 and 6 are applied.
Figure 7B:
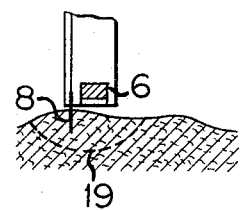

FIGS. 7A and 7B show the manner in which the embodiments of FIGS. 5 and 6 respectively are applied to a tumorous part 19.

Figure 8:
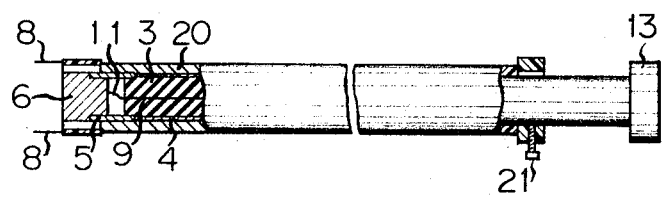
FIG. 8 is a fractional sectional view of still another embodiment of the invention.

FIG. 8 illustrates still another embodiment of the invention. The same parts of FIG. 8 as those of FIG. 2 are denoted by the same numerals and description thereof is omitted. Around the periphery of the coaxial line 3 is fitted an outer cylindrical metal casing 20 in a manner to slide in the longitudinal direction of said coaxial line 3. To one end of the metal casing 20, which corresponds to the detecting element end, is secured fixing needles 8. The metal casing 20 is slidable relative to coaxial cable 3 and relative to holder 5. At the other end of the metal casing 20 which extends outside of the living body is provided a screw 21, which is tightened to fix the metal casing 20 relative to the coaxial line 3.

When the apparatus of FIG. 8 is used, the screw 21 is first loosened to adjust the position of the metal casing 20 so as not to allow the fixing needle 8 to project from the front side of the detecting element. When it is confirmed that the fixing needle 8 does not come out of the front side of the detecting element 6, the screw 21 is tightened to fix the metal casing 20 to the coaxial line. After the detector 2 is inserted into the living body to bring the detecting element 6 near the tumorous part, the screw 21 is loosened from outside of the living body. The metal casing 20 is urged to allow the fixing needle 8 to be pricked into said tumorous tissue. Upon completion of the examination, the fixing needle 8 is drawn therefrom. The embodiment of FIG. 8 also prevents the fixing needle from unnecessarily sticking out while the detector is introduced into the living body or removed therefrom, so that the tissue thereof is saved from injury.

Figure 9:
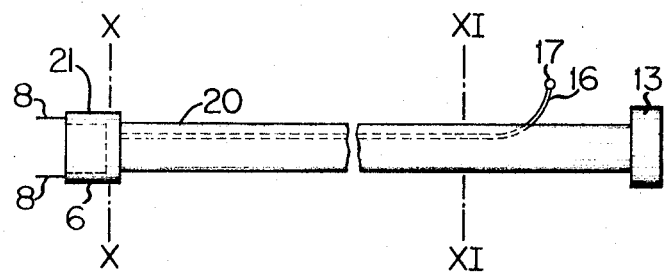
FIG. 9 is a fractional sectional view of a modification of the embodiment of FIG. 8.
Figure 10:
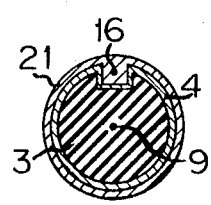
FIGS. 10 and 11 are sectional views on lines X — X and XI — XI respectively of the embodiment of FIG. 9.
Figure 11:
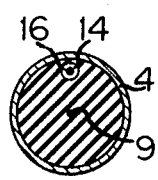

FIG. 9 is a modification of the embodiment of FIG. 8. The same parts of FIG. 9 as those of FIGS. 5 and 8 are denoted by the same numerals and description thereof is omitted. The sectional views of the embodiment of FIG. 9 on lines X — X and XI — XI are presented in FIGS. 10 and 11 respectively. As shown in FIG. 10, an end part 21 of an inner surface of an outer cylindrical metal casing 20 is projected outwardly (i.e., enlarged) and there is connected thereto a flexible filament 16 as shown in FIG. 5. Fixing needles 8 are projected from the end of metal casing 21. According to this embodiment, the outer cylindrical metal casing portion 21 disposed around the periphery of the coaxial line 3 is slidably adjusted from outside of the living body by the flexible filament 16.

As apparent from the foregoing description, the present invention provides a catheter type semiconductor radiation detector which is capable of fixing a detecting element 6 in a tumorous part by allowing a fixing needle 8 to be pricked thereinto.

What we claim is:

1. A catheter type semiconductor radiation detector comprising:
   a detecting element having at least two electrodes and which is adapted to be introduced into a living body to detect radiation prevailing therein;
   a metal holder, one part of which is connected to one of said electrodes and which supports said detecting element;
   a flexible coaxial line comprising an external conductor connected to another part of the holder, and a central conductor connected to the other electrode of said detecting element, for providing electrical connection for said detecting element outside of the living body;
   a needle, movable relative to said metal holder, adapted for fixing the detecting element at a prescribed position in the living body; and
   means coupled to said needle for selectively moving said needle relative to said holder to selectively cause said needle to project and not to project from a surface of said radiation detector.

2. The radiation detector according to claim 1 wherein the metal holder is perforated with a through hole, and wherein said moving means includes a flexible filament movably mounted in said through hole, said fixing needle being connected to the one end of said flexible filament nearest said detecting element, the other end of said flexible filament extending outside of said detector, whereby said fixing needle is selectively moved into said through hole by operating said other end of said flexible filament, and moved to project from said through hole.

3. The radiation detector according to claim 2 wherein said detecting element is positioned at a portion of said metal holder on the longitudinal side of said radiation detector and said through hole is perforated beginning on said longitudinal side.

4. The radiation detector according to claim 2 wherein said detecting element is disposed at one end of said radiation detector in its longitudinal direction and said through hole is perforated starting with said one end in parallel to the longitudinal direction.

5. The radiation detector according to claim 1 wherein said moving means includes an outer cylindrical metal casing slidable along the outside of the coaxial line, said fixing needle being coupled to the end of said outer cylindrical metal casing located nearest said detecting element, said fixing needle being moved from the detecting plane into the interior of said radiation detector by selectively sliding said metal casing relative to said coaxial line.

6. The radiation detector according to claim 5 wherein said outer cylindrical metal casing slides by operating the opposite end of the metal casing to the detecting element.

7. The radiation detector according to claim 5 wherein said moving means includes a flexible filament in the outer cylindrical metal casing, said flexible filament being drawn out through a penetrating hole in said metal casing to the outside of the detector, said drawn out end of said flexible filament being operated to selectively slide said metal casing relative to said coaxial line.

* * * * *